May 15, 1956  R. L. HILD  2,745,210
INSECTICIDE DISTRIBUTOR
Filed July 7, 1953

INVENTOR.
Raymond L. Hild
BY
*Webster & Webster*
ATTYS

United States Patent Office 2,745,210
Patented May 15, 1956

2,745,210
INSECTICIDE DISTRIBUTOR

Raymond L. Hild, Biggs, Calif.

Application July 7, 1953, Serial No. 366,563

4 Claims. (Cl. 43—125)

The present invention is directed to, and it is a major object to provide, a novel insecticide distributor; such device being operative to produce a forcefully projected blast, which combines the air stream from an engine driven blower and the exhaust gases from the engine, and which blast carries the insecticide forwardly a substantial distance from the device and in the form of a mist or fog.

Another important object of the invention is to provide an engine driven insecticide distributor in which the exhaust gases from the engine are projected forwardly centrally within the air stream from the blower at the point of discharge; the insecticide being in solution, preheated in a novel manner, and introduced into the hot exhaust gases ahead of said point of discharge. The advantageous result is that the insecticide solution is effectively vaporized by the hot exhaust gases prior to admixture with the relatively cold air stream, so as to produce the desired fog or mist from said solution.

A further object of the invention is to provide an engine driven insecticide distributor which embodies a nozzle assembly, of novel construction, for the discharge in a regulated manner of the exhaust gases carrying the vaporized insecticide solution and the forceful air stream produced by the blower.

An additional object of the invention is to provide an engine driven insecticide distributor in which the entire device is compact, relatively light weight, and cart-supported for ease of movement from place to place when in use.

It is also an object of the invention to provide an engine driven insecticide distributor which is designed for ease and economy of manufacture.

Still another object is to provide a practical and reliable engine driven insecticide distributor, and one which will be exceedingly effective for the purpose for which it is designed.

These objects are accomplished by means of such structure and relative arrangement of parts as will fully appear by a perusal of the following specification and claims.

Figure 1:
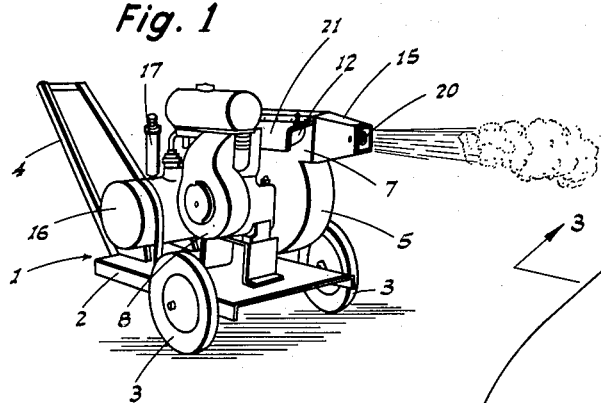
Fig. 1 is a perspective view of the engine driven insecticide distributor as in use.
Figure 2:
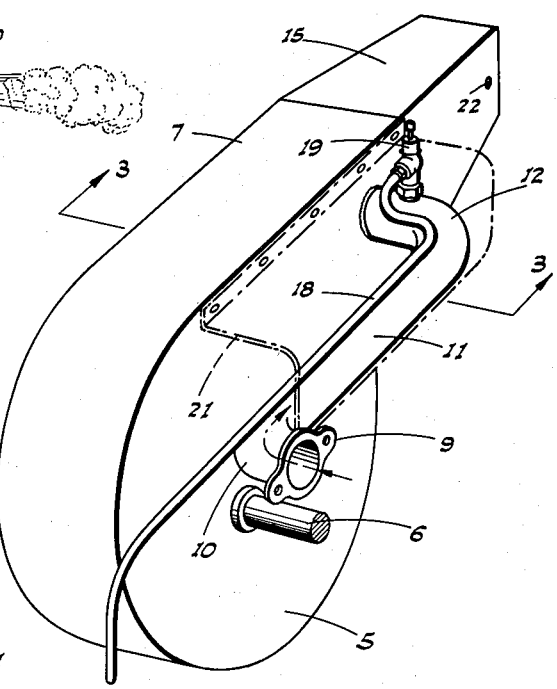
Fig. 2 is an enlarged perspective view of the blower, and associated parts, detached from the engine and cart.
Figure 3:
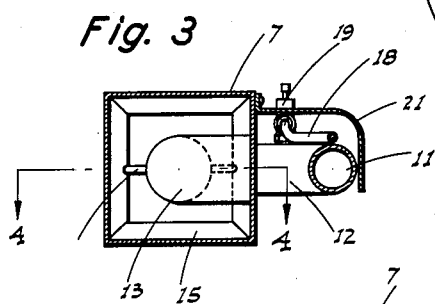
Fig. 3 is a transverse section on line 3—3 of Fig. 2.

Referring now more particularly to the characters of reference on the drawings, the device comprises a push cart, indicated generally at 1, and which cart includes a platform 2, transversely spaced supporting wheels 3, and—at the rear—an upwardly and rearwardly inclined push handle 4.

A relatively heavy-duty air blower 5 is mounted on the platform 2 adjacent one side thereof; such blower including a laterally inwardly projecting transverse shaft 6, and—at the top—a forwardly projecting tangential outlet duct 7.

The shaft 6 of air blower 5 is connected to, and driven by, a relatively small gasoline engine unit 8 mounted on the platform 2 alongside said blower.

The exhaust manifold of the engine unit 8 is connected by a flange 9 to an elbow 10 on the rear end of an exhaust pipe 11 which extends horizontally forward along the near side of the blower 5.

At its forward end the exhaust pipe 11 includes an inturned elbow 12 which extends through said side of the air blower 5, communicating within the outlet duct 7 with the adjacent end of a forwardly turned elbow 13 formed on the rear end of a longitudinal, forwardly projecting exhaust gas discharge tube 14; the elbow 13 and tube 14 being suitably insulated, as shown, to prevent undue cooling of said parts by the air stream which flows forwardly in the duct 7 from the blower 5.

The exhaust gas discharge tube 14 projects forwardly some distance beyond the duct 7, and the latter is fitted—in spaced, symmetrically surrounding relation to said projecting portion of the tube 14—with an air blast nozzle 15 which is rectangular in cross section, but which tapers from its rear end to its forward end.

Rearwardly of the engine unit 8 the platform 2 supports a tank 16 for an insecticide solution, which solution is maintained under pressure as by means of a pump 17 on said tank.

The insecticide solution flows under pressure from the tank 16 through a relatively small delivery or supply pipe 18 which extends to an adjustable needle valve 19 mounted on and communicating with the elbow 12 included in the exhaust pipe 11 at the forward end of the latter. By predetermined adjustment of the needle valve 19 a regulated quantity of the insecticide solution from the tank 16 is delivered into the hot exhaust gases which flow from the engine unit 8 through the exhaust pipe 11, elbows 12 and 13, and discharge tube 14.

As the elbow 13 and discharge tube 14 are insulated against cooling by the air stream which flows forwardly in the duct 7 and nozzle 15, such insecticide solution as fed into the hot exhaust gases at the elbow 12 is fully and effectively vaporized before reaching the discharge end 20 of said tube 14.

At said discharge end 20 of tube 14 the hot exhaust gases discharge forcefully forward centrally within the strong air stream which simultaneously delivers in the same direction out of the nozzle 15.

As the hot exhaust gas stream, carrying the vaporized insecticide solution, enters the relatively colder air stream, and said streams thence carry forward together as a forceful blast, a fog or mist is produced by said insecticide in such blast.

As a further aid to full and effective vaporization of the insecticide solution, upon its introduction into the hot exhaust gases, the pipe 18 follows in contacting engagement with the exhaust pipe 11, including elbow 12, preheating the insecticide solution prior to its feeding through the needle valve 19. Heat escape from the assembly of the exhaust pipe 11, elbow 12, and the contacting portion of the pipe 10 is minimized by enclosing such parts within a hood 21 secured to the adjacent side of the blower 5.

Figure 4:
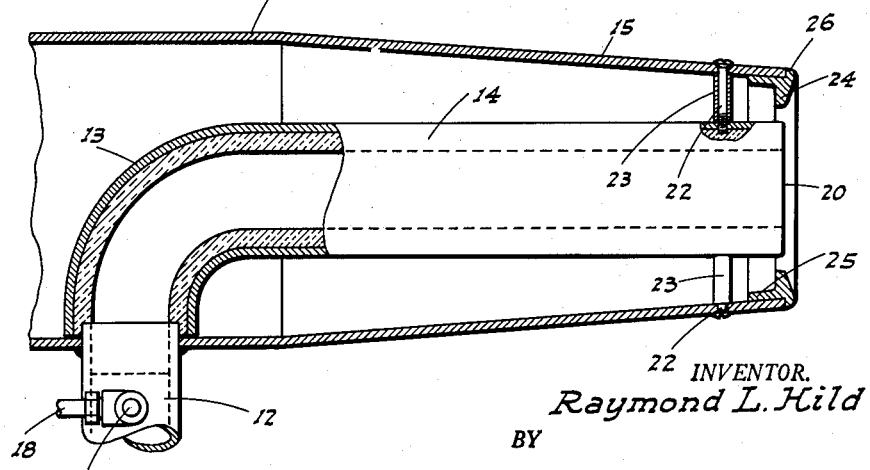
Fig. 4 is an enlarged fragmentary plan view, mainly in section, showing the outlet duct and discharge nozzle of the blower, together with the associated parts of the device.

The discharge tube 14 is supported at its forward end portion centrally in the nozzle 15 by opposed radial securing screws 22 having locator sleeves 23 thereabout; the screws 22 extending through the adjacent walls of nozzle 15, then through the related sleeves 23, and finally threading into the discharge tube 14, as shown in Fig. 4.

With the described engine driven device, liquid insecticide is effectively vaporized and thence discharged forwardly as a fog or mist in a forceful blast; such blast carrying a substantial distance ahead of the device.

The device is not only useful indoors, as for example in dairy barns or the like, but may also be used effectively outdoors for treating vegetation, exterior walls, etc.

When the device is used with the nozzle 15 full-open at its discharge end, the resultant insecticide carrying blast is of relatively high volume, which is especially desirable for the application of residual insecticides, i. e. insecticides wherein the fog or mist particles are to be deposited by the blast on a surface such as a wall. Under this operating condition the reach of the machine—i. e. the distance to which the blast will extend—is relatively long, and the fog or mist particles are coarse enough for spraying into contact with a surface.

When it is desired to produce a fog or mist, from the insecticide solution, which is sufficiently fine, in particle size, to remain in suspension in the air, but with the blast having lesser reach, it is necessary to increase the velocity of the blast while decreasing its volume. This is accomplished by the employment, in the outer end portion of the nozzle 15, of a rectangular insert baffle 24. This rectangular insert baffle 24 includes, on each of the four sides, a longitudinally inwardly projecting flange 25 which engages in the nozzle 15; the extent of engagement being limited by stop shoulders 26.

The rectangular insert baffle 24 projects on the four sides toward the discharge end 20 of the tube 14, terminating short of said tube, but effectively reducing the spacing which initially existed between the same and the corresponding side of said nozzle 15. With such reduction of the spacing—i. e. the area of air escape between the discharge end 20 of tube 14, and the corresponding discharge portion of the nozzle 15—the air stream, as it emits from said nozzle, is substantially increased in velocity but reduced in volume.

As the inwardly projecting flanges 25 of the rectangular insert baffle 24 are of substantial length, such baffle can be adjusted outwardly to a certain extent; such adjustment being permitted simply by first loosening the securing screws 22 which support the tube 14, and then again advancing the screws to the necessary extent. Normally, the securing screws 22, when tightened, deform and bind the corresponding sides of the rectangular nozzle 15 against the related baffle flanges 25 sufficient to hold the baffle 24 in place.

When the insert baffle 24 is in its full-in position, as in Fig. 4, the greatly increased velocity of the blast causes the particle size of the fog or mist to be very fine, with the result that the insecticide remains in suspension in the air; the reach of the machine then being relatively short.

However, by adjusting the insert baffle outwardly, slightly increasing the space between the discharge end 20 of tube 14 and the inner edges of said baffle, the reach of the machine can be extended to a certain extent, yet maintaining the insecticide, in the fog or mist, in a fine-particle condition for air suspension, since the baffle 24, besides being adjustable, is obviously removable upon loosening the screws 22.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device, for distributing an insecticide solution, comprising a blower having a discharge duct from which a forceful air stream is projected by said blower, an internal combustion engine driving the blower, an exhaust pipe assembly leading from the engine, said assembly including a discharge tube disposed within the duct in position to discharge the exhaust gases into the air stream in the same direction of flow, a tank for a quantity of insecticide solution, and an insecticide solution supply pipe connected between the tank and said exhaust pipe assembly intermediate the ends of the latter; said exhaust pipe assembly including a pipe section outside of said blower and its duct, and the supply pipe for a portion of its length being in heat exchange contact with said exhaust pipe section.

2. A device, for distributing an insecticide solution, comprising a blower having a discharge nozzle from which a forceful air stream is projected by said blower, an internal combustion engine driving the blower, an exhaust pipe assembly leading from the engine, said assembly including a discharge tube in position to discharge the exhaust gases within and in the same direction as said air stream, a tank for a quantity of insecticide solution, and an insecticide solution supply pipe connected between the tank and said exhaust pipe assembly intermediate the ends of the latter; the nozzle of the blower and exhaust discharge tube having their free ends in spaced relation radially but terminating in substantially the same transverse plane; and an insert baffle removably engaged in the free end portion of the nozzle operative to partially reduce the spacing initially existent between said ends of the tube and nozzle.

3. A device, as in claim 2, in which the insert baffle is adjustable longitudinally of the nozzle to a selected point ahead of the free end of the tube whereby said reduction in spacing can be altered.

4. A device, as in claim 1, in which said pipe section extends alongside and adjacent the blower duct; and a hood mounted on the blower and overhanging said portion of the supply pipe and the adjacent portion of the pipe section.

References Cited in the file of this patent

UNITED STATES PATENTS

| | | |
|---|---|---|
| 714,802 | Kiser | Dec. 2, 1902 |
| 1,282,697 | Johnson | Oct. 22, 1918 |
| 1,930,588 | Dibble | Oct. 17, 1933 |
| 2,655,406 | Loy et al. | Oct. 13, 1953 |